UNITED STATES PATENT OFFICE.

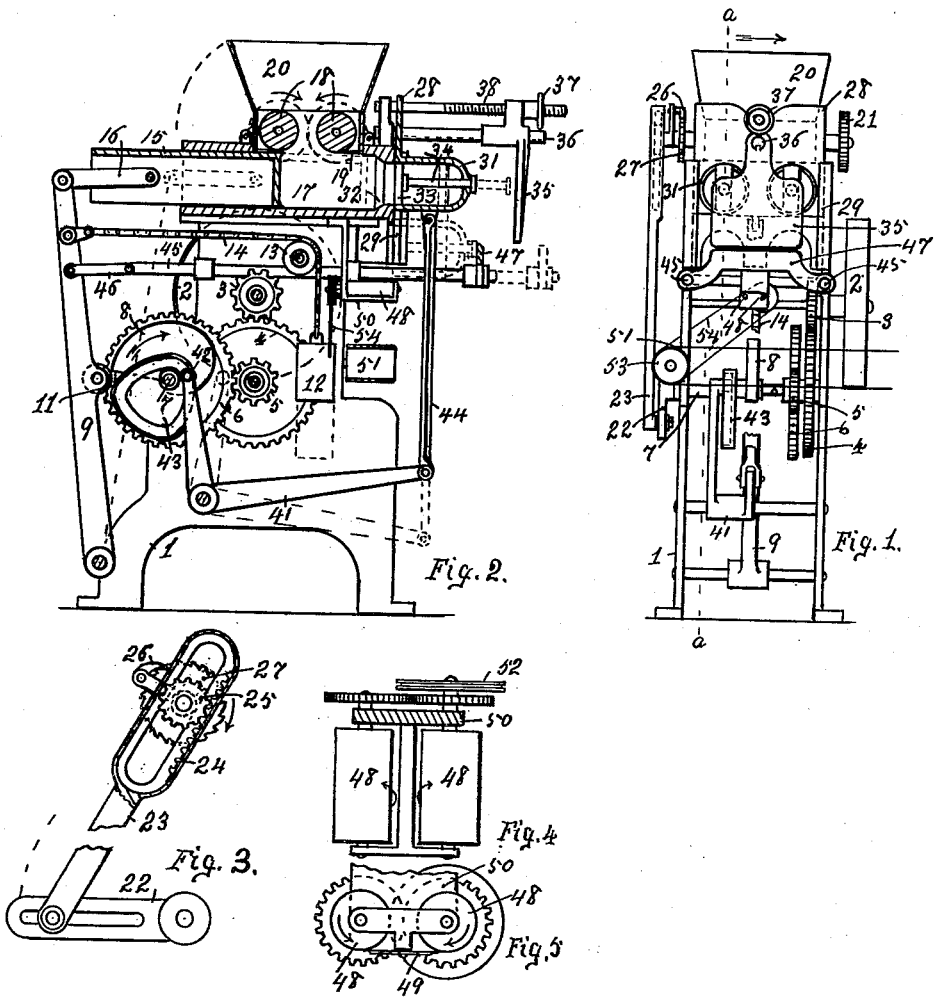

FRANK STREICH, OF CINCINNATI, OHIO, ASSIGNOR TO THE TRIUMPH MANUFACTURING COMPANY, OF CINCINNATI, OHIO, A CORPORATION OF OHIO.

DOUGH DIVIDING AND SCALING MACHINE.

No. 850,074.　　　Specification of Letters Patent.　　　Patented April 9, 1907.

Application filed January 4, 1907. Serial No. 350,718.

*To all whom it may concern:*

Be it known that I, FRANK STREICH, a citizen of the United States, residing at Cincinnati, Ohio, have invented a new and useful Improvement in Dough Dividing and Scaling Machines, of which the following is a specification.

My invention relates to dough dividing and scaling-machines of the class adapted to the use of bread-bakers and others; and the objects of my improvements are to provide means for dividing the dough into loaves of uniform size, to provide means for separating and depositing the loaves on an endless carrying-apron, to provide means for feeding the dough intermittently to the plunger-box to prevent it from pressing on the top of the plunger, to provide a weight arranged to exert a uniformly-yielding pressure on the plunger in its different positions of movement, and to construct and assemble the various parts in such manner as will secure simplicity, durability, efficiency, and facility of operation. These objects are attained in the following-described manner, as illustrated in the accompanying drawings, in which—

Figure 1 is a front elevation of a dough dividing and scaling machine embodying my improvements; Fig. 2, a sectional elevation on the dotted line *a a* of Fig. 1; Fig. 3, an elevation with parts in section of the crank-shaft, connecting-rod, and its ratchet connection with a feeding-roll; Figs. 4 and 5, a plan and a front elevation, respectively, of the separating-rolls.

In the drawings, 1 represents the supporting-frame, 2 a driven pulley, and 3, 4, 5, and 6 a series of gears in train for reducing and transmitting motion from the pulley to a cam-shaft 7. A cam 8, secured on said shaft, serves to move arm 9 in a rearward direction by contact with idler 11 thereon. A weight 12, suspended over idler 13 by a chain 14 from arm 9, serves to move said arm in a forward direction under a constant yielding exertion. Plunger 15 is connected to said arm by means of a link 16 and is reciprocated thereby within dough-box 17. Feed-rolls 18, provided with cleaning-scrapers 19, are journaled a short distance apart within hopper 20 and are connected by gears 21 for rotating them simultaneously in opposite directions. A slotted crank 22 is secured on the cam-shaft 7, and a connecting-rod 23 is adjustably secured at one end thereto. The other end of said rod is provided with a rack 24, which engages with a pinion 25, which is idly mounted on the shaft of one of the feed-rolls 18. A pawl 26, carried by said pinion, engages with the teeth of a ratchet-wheel 27, which is secured on the shaft of said feeding-roll and whereby said roll is rotated intermittently by the reciprocating movement of the connecting-rod during the revolutions of the crank.

A plate 28, slidably mounted in vertical grooves 29, is provided with a plural number of open cylindrical molds 31, which register at one end with corresponding discharge-openings 32, formed in the front wall of box 17. Pistons 33, mounted to slide within said molds, are each provided with a stem 34, adapted to contact with stop 35. Said stop is splined on a stud 36 and is adjustable thereon by means of a hand-wheel 37, which is adjustably threaded on stud 38, whereby the forward movement of the pistons may be limited as desired by said stop.

A bell-crank lever 41, pivotally mounted on the supporting-frame, is provided at one end with an antifriction-roller 42, engaging with the grooved cam 43, which is secured on cam-shaft 7. The other end of lever 41 carries a connecting-rod 44, which is attached to molds 31, whereby the molds and plate 28 are moved and maintained in different vertical positions by the action of the grooved cam on said lever. Guide-rods 45, slidably mounted on the supporting-frame, are connected to arm 9 by means of links 46 and are movable thereby in a forward or rearward direction. A flange 47, secured on the front end of said guide-rods, serves to contact with stems 34 and move the pistons simultaneously in a rearward direction for discharging the contents from the molds.

Separating-rolls 48, provided with cleaning-scrapers 49, are journaled in bracket 50 and geared together to rotate simultaneously and in opposite directions for separating the loaves as they are discharged thereon from the adjacent molds 31 and delivering said loaves a short distance apart on the endless carrying-apron 51. One of said rolls 48 is provided with a pulley 52, whereby they are driven from the apron-roll 53 by means of a belt 54. Said apron-roll may be actuated by means of gear connections (not shown) with shaft 55 or otherwise, as desired.

In operation the dough is placed in the hopper and the plunger is moved in a rearward direction, as shown in Fig. 2, by the action of cam 8 on arm 9. Crank 22 then carries the connecting-rod 23 in a downward direction and actuates the ratchet connections of the feed-roll therewith to simultaneously rotate the feed-rolls to deliver a portion of the dough from the hopper to within the dough-box 17. The action of the grooved cam 43 on the bell-crank lever simultaneously moves and maintains the molds in registration with the corresponding discharge-openings 32 in the front wall of the dough-box 17. Cam 8 then releases arm 9, and simultaneously the motion of the feed-rolls is discontinued by the action of the ratchet mechanism during the upward movement of the connecting-rod 23. Upon the release of arm 9 from cam 8 the weight 12 causes said arm to move the plunger in a forward direction and force the dough in the box 17 to fill the molds. The forward movement of the pistons in the molds under the pressure of the dough therein is limited by the contact of stems 34 with stop 35. Immediately after the molds are filled they are moved and maintained in a lower position, as shown by the dotted lines in Fig. 2, by the action of the grooved cam on the bell-crank lever. The plunger is then carried in a rearward direction by the action of cam 8 on arm 9, and said arm simultaneously actuates the guide-rods 45 to move flange 47 in a rearward direction into contact with stems 34 and to force the pistons to discharge the dough in loaves from the molds and upon the separating-rolls 48, whereby they are separated and delivered on the continuously-moving apron 51. During the maintenance of the plunger at rest in its most rearward position the molds are again moved into registration with the discharge-openings 32 by means of the action of the grooved cam on the bell-crank lever, and the feed-rolls are actuated by the connecting-rod 23 and their ratchet connection therewith to feed a sufficient quantity of dough from the hopper to box 17 for again filling the molds. This operation may be repeated continuously with each rotation of shaft 7 for dividing and scaling the dough into loaves of predetermined and uniform size.

Having fully described my improvement, what I claim as my invention, and desire to secure by Letters Patent of the United States, is—

1. The combination of a box, a plunger therein, feed-rolls mounted directly thereover, and means for alternately reciprocating the plunger and rotating said rolls.

2. The combination of a box provided with feed-rolls and with discharge-openings, a plunger therein, molds provided with pistons, means for moving and maintaining said molds in registration with said openings, and a weight arranged to move the plunger in the box toward said openings during the registration of the molds therewith.

3. The combination of a box provided with discharge-openings, a plunger therein, feed-rolls thereover, a ratchet mechanism for intermittently rotating said rolls, molds provided with pistons, and cam-actuated mechanism for alternately reciprocating the plunger and the molds in and out of registration with the discharge-openings.

4. The combination of a box provided with discharge-openings, a plunger therein, feed-rolls communicating with the box, ratchet mechanism for rotating the rolls intermittently, and a cam-actuated mechanism and a weight for respectively moving the plunger from and toward the openings.

5. The combination of a box provided with discharge-openings and with a plunger, molds provided with pistons, cam-actuated mechanism for intermittently reciprocating the molds in and out of registration with the discharge-openings, and a weight and cam-actuated mechanism for intermittently reciprocating the plunger between the respective movements of the molds and simultaneously actuating the pistons.

6. The combination of molds provided with pistons, means for moving and maintaining them in different vertical positions, means for moving the pistons to discharge the contents of the molds, and separating-rolls for receiving and delivering the contents of the molds separately on a driven conveyer.

7. The combination of molds formed with open ends and provided with pistons, adjustable means for limiting the forward movement of the pistons, a cam-actuated mechanism for moving the pistons in a rearward direction, and separating-rolls mounted at fixed points below the molds.

8. The combination of a box provided with discharge-openings, feed-rolls thereover, a plunger within the box, a weight for moving the plunger toward the openings, cam-actuated mechanism for moving the plunger in the opposite direction and means for actuating the feed-rolls intermittently.

9. The combination of a box provided with a discharge-opening, with a plunger and with feed-rolls, means for intermittently actuating said plunger and also said feed-rolls, cam-actuated mechanism and a mold movable thereby into and out of registration with the discharge-opening.

10. The combination of a box provided with feed-rolls, a discharge-opening and with a reciprocating plunger, means for intermittently actuating the feed-rolls and the plunger, a mold provided with a piston, adjustable means for limiting the movement of the piston, means for moving the mold in and out of registration with the discharge-opening, and means movable simultaneously with the plunger for actuating the piston.

11. The combination of a mold provided with a piston, a delivering-roll thereunder, and cam-actuated mechanism for reciprocating the mold vertically and also for moving the piston horizontally for discharging the contents of the mold on the delivering-roll.

12. The combination of a delivering-roll, a mold provided with a piston, means for moving and maintaining said mold in different predetermined positions, adjustable means for limiting the movement of the piston in one direction during the maintenance of the mold in one of said positions, and means for moving the piston in the opposite direction for discharging the contents from the mold upon said roll, during its maintenance in another said position.

FRANK STREICH.

Witnesses:
 WM. P. FUECHTER,
 P. H. OVERKAMP.